United States Patent
Holmes et al.

(10) Patent No.: US 6,226,784 B1
(45) Date of Patent: May 1, 2001

(54) RELIABLE AND REPEATABLE PROCESS FOR SPECIFYING DEVELOPING DISTRIBUTING AND MONITORING A SOFTWARE SYSTEM IN A DYNAMIC ENVIRONMENT

(75) Inventors: Marty Holmes, Suwanee; Imran Jan, Duluth; Kenneth Lockie, Alpharetta; Kimberley L. McGuire, Atlanta, all of GA (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/172,287

(22) Filed: Oct. 14, 1998

(51) Int. Cl.[7] ........................................ G06F 9/45
(52) U.S. Cl. .................................... 717/1; 717/11
(58) Field of Search ........................ 717/1, 2, 3, 11, 717/9; 705/7, 4; 707/10, 203

(56) References Cited

U.S. PATENT DOCUMENTS

| | | | |
|---|---|---|---|
| 4,309,756 | * | 1/1982 | Beckler ........................... 717/9 |
| 4,558,413 | * | 12/1985 | Schmidt et al. ................. 707/203 |
| 4,751,635 | * | 6/1988 | Kret ............................... 707/10 |
| 4,975,840 | * | 12/1990 | DeTore et al. ................... 705/4 |
| 5,233,513 | * | 8/1993 | Doyle ............................. 705/7 |
| 6,023,586 | * | 2/2000 | Gaisford et al. ................. 717/11 |

* cited by examiner

Primary Examiner—Mark Powell
Assistant Examiner—Hoang-Vu Antony Nguyen-Ba

(57) ABSTRACT

A reliable and repeatable process for specifying, developing, distributing, and monitoring a software system or application within a dynamic environment includes the steps of specifying a set of software system requirements during a discovery process within a data processing environment, establishing a development and delivery schedule for distribution of the software system, developing a software system corresponding to the software system requirements during a development process, and developing and testing an install package to be used to install the software system in a test environment within the data processing environment. The install package includes the software system and routines configured to automatically instantiate the software system in the test environment. The developing and testing step takes a first amount of time. Other steps include distributing said install package to a test user community for testing of said software system during a testing process which takes a second amount of time, and revising the software system to comply with the software system requirements when a defect is discovered and then repeating the developing and testing and the distributing steps. The revising step affects the delivery schedule by adding a predetermined amount of time thereto. The process also includes a step of placing the software system or the revised software system into general use after successful completion of the testing process. The placing step takes a third amount of time. The first, second, and third amounts of time are pre-determined based on the development and delivery schedule prior to development of the software system.

11 Claims, 4 Drawing Sheets

RELIABLE AND REPEATABLE PROCESS FOR SPECIFYING DEVELOPING DISTRIBUTING AND MONITORING A SOFTWARE SYSTEM IN A DYNAMIC ENVIRONMENT

BACKGROUND OF THE INVENTION

1. Field of the Invention

The present invention relates to processes and systems used during development of computer software systems.

2. Description of the Related Art

In large organizations and, especially, those in which many computer software systems and applications are utilized to carry out particular business functions (e.g., accounting systems, management systems, help-desk systems, user support systems, etc.), providing for system version updates, modifications, and changes has become a serious problem. For example, allocating resources (e.g., programmers, computing platforms, testing personnel, etc.) in efficient ways to effect version changes, upgrades, maintenance fixes, etc. has become a management problem that has not been adequately addressed by currently available planning systems and processes.

The aforementioned resource allocation and management problems are exacerbated by the fact that many organizations utilize so many systems and applications that effectively and efficiently manage resources to ensure robust system performance across all systems has become almost impossible. As such, many organizations employ systems that are allowed to operate with known problems or deficiencies for long periods of time without being fixed or changed. To add insult to injury, as the number of systems has increased, so to have the number of users, networks, and computing platforms, thus making system control and maintenance almost impossible objectives. Unfortunately, in modern software use environments, the management of software applications and systems through development, distribution, and post production (e.g., system performance monitoring, etc.) has lacked a formalized procedure, thus causing a state of "ad hoc" management. As a result, many organizations have developed and deployed low quality software products and systems which must be re-engineered due to software bugs, performance limitations, etc. The costs associated with such re-engineering is significant as resources are continually expended.

To address these problems, organizations have long sought to minimize the number of systems and applications used to solve business problems. Unfortunately, by reducing the number of software tools, organizations have often reduced the number of problems they can address and services that can be provided. As a result, many organizations cannot compete because they cannot develop and deploy systems that must be updated and changed to remain effective. There is currently no effective and reliable process or system which may be used within an organization to manage resources to ensure software system enhancement and proper functioning.

Additionally, although many organizations apply modern project management systems and paradigms, the same often have not been applied in a consistent and/or reliable manner. Accordingly, each software system needing development (e.g., a project) often takes on its own character including its own sets of dependencies, resource needs, time frames, etc. No uniform approach toward software development, formal or otherwise, has been proposed to uniformly structure the development and distribution of new and/or improved software systems within an organization.

Thus, there exists a need to provide new and improved project management processes that are reliable and repeatable across a number of software development and distribution efforts. To be viable, such processes, must incorporate standardized milestones, provide for uniform deliverables, and be easy to deploy. In particular, the processes must be reliable and repeatable in terms of specifying a set of requirements for a new and/or improved software system, developing and distributing that software system, and in terms of system monitoring within a dynamic environment such as a networked automatic data processing environment, etc.

SUMMARY OF THE INVENTION

The present invention solves the problems mentioned in the background of the invention section hereof by providing a reliable and repeatable process for specifying, developing, distributing and monitoring a software application or system in a dynamic environment such as within a networked automatic data processing environment. As such, organizations involved in the development and distribution of software applications now will be able to more effectively and efficiently manage and control resources used in such development and distribution activities.

In particular, the present invention provides a reliable and repeatable process for specifying, developing, distributing, and monitoring a software system or application within a dynamic environment that includes the steps of specifying a set of software system requirements during a discovery process within a data processing environment, establishing a delivery schedule for distribution of the software system, developing a software system corresponding to the software system requirements during a development process within the data processing environment, and developing and testing an install package to be used to install the software system in a test environment within the data processing environment during an integration process. The install package includes the software system and other routines which are configured to automatically instantiate the software system in the test environment. The developing and testing step takes a first amount of time. The process also includes the steps of distributing the install package to a test user community for testing during a testing process which takes a second amount of time, revising the software system to comply with the software system requirements when a defect is discovered during the testing process and then repeating the developing and testing and the distributing steps with a revised software system. The revising step affects the delivery schedule by adding a predetermined amount of time thereto. The process also includes a step of placing the software system or the revised software system into general use relative to a particular user community after successful completion of the testing process. The placing step takes a third amount of time. The first, second, and third amounts of time are pre-determined prior to development of the software system and are based on the delivery schedule.

BRIEF DESCRIPTION OF THE DRAWINGS

The present invention is discussed in detail below with regard to the drawing figures attached hereto, of which.

DETAILED DESCRIPTION OF THE PREFERRED EMBODIMENTS

Figure 1:
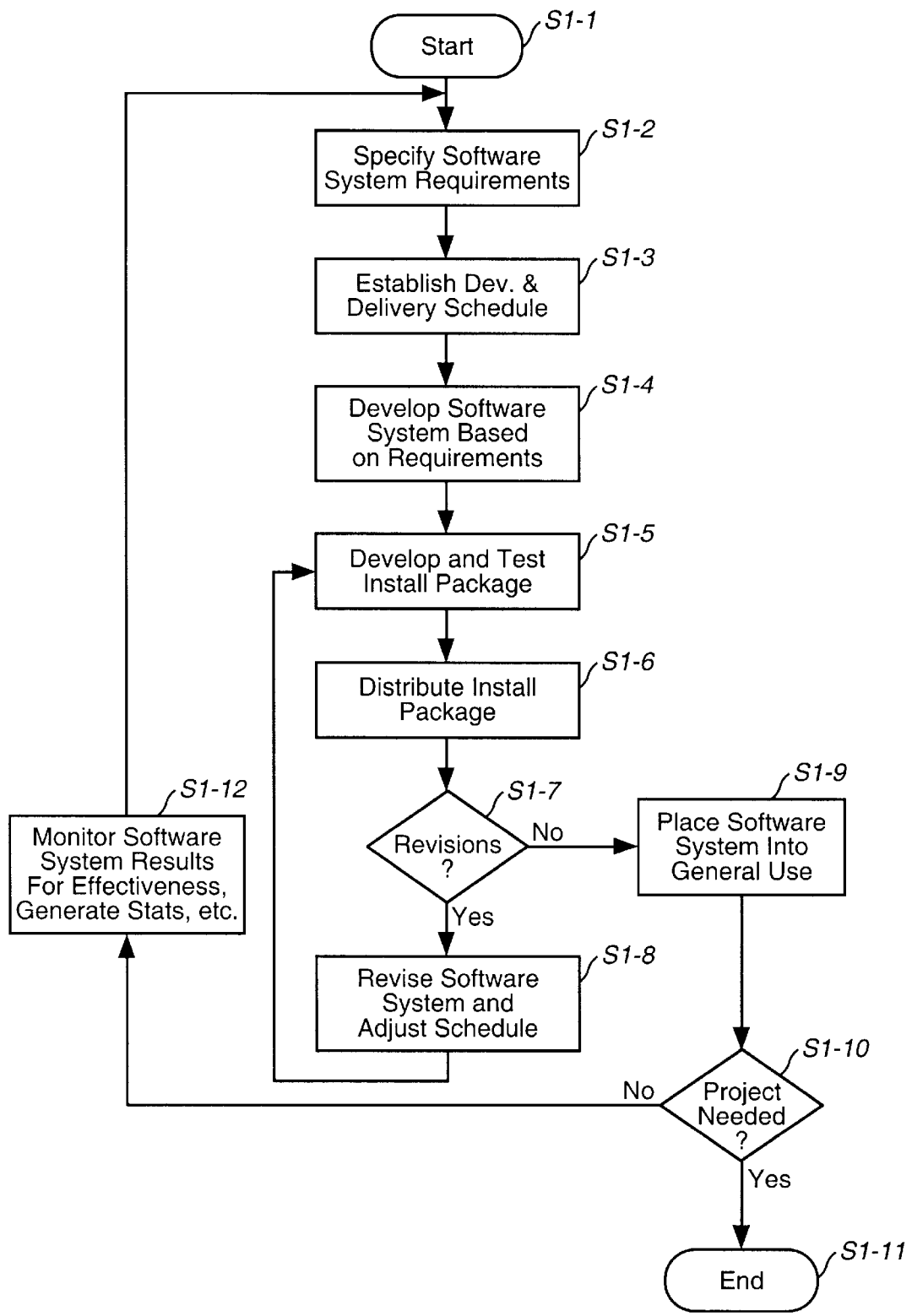
FIG. 1 is a flowchart that illustrates a reliable and repeatable process for specifying, developing, distributing, and monitoring a software system within a dynamic environment according to a preferred embodiment of the present invention.

The present invention is now discussed in detail with regard to the drawing figures that were briefly described above. Unless otherwise indicated, like parts and processes are referred to with like reference numerals.

Referring now to FIG. 1, depicted therein is a flow chart that illustrates the steps of a reliable and repeatable process for specifying, developing, distributing, and monitoring a software system within a data processing environment (e.g., a dynamic use environment) according to a preferred embodiment of the present invention. In particular, FIG. 1 illustrates the process steps that are carried out to define a reliable and repeatable process according to a preferred embodiment of the present invention.

The reliable and repeatable process depicted in FIG. 1 starts at step S1-1 and immediately proceeds to step S1-2. At step S1-2, a software system and, in particular, requirements therefore are specified and documented. Such requirements may include user requirements, data flow requirements, input requirements, output requirements, etc. Such requirements may be based on system statistics and metrics that may be realized through system performance monitoring processes (e.g., trouble reports, etc.). The establishment of such software systems requirements will be immediately understood by those skilled in the art of software development and the like.

Next, at step S1-3, a delivery schedule will be established. Such a delivery schedule will be based on a master schedule template used to establish time frames for developing, distributing, and monitoring a software system in a dynamic environment according to a preferred embodiment of the present invention. The established delivery schedule will include dependencies, time frames, resource needs, etc. that must be arranged and provided for to effectively and efficiently develop and deliver a software system based on the requirements specified during step S1-2. The aforementioned master schedule template may be formulated in a software package that facilitates milestone and group management and activity planning such as one similar or like MICROSOFT PROJECT which is a software package manufactured and marketed by MICROSOFT CORPORATION. Alternatively, such a delivery schedule based upon a master type delivery schedule that may be generated using a spreadsheet tool such as MICROSOFT EXCEL which is manufactured and marketed by MICROSOFT CORPORATION. PROJECT and EXCEL are trademarks and/or registered trademarks of MICROSOFT CORPORATION.

In any case, the master schedule on which the delivery schedule for the particular software system is based, will include specific time frames for carrying out particular functions, and the particular resources needed to deliver a particular piece of software or other software systems in a dynamic environment such as one embodying a network architecture. In accordance with the present invention, the particular delivery schedule that is established based upon a master schedule, will include an integration phase embodying integration processes to facilitate the establishment of a particular install tool, and for the distribution and testing of that install tool according to the present invention. The integration phase may take any amount of time such as a period of days (e.g., 5 days, etc.). Additionally, the particular schedule established during step S1-3 may include an acceptance and testing phase wherein the install package developed during the integration phase may be distributed for Q&A testing wherein defects, if any, related to the developed software system may be determined, etc. Such an acceptance and testing phase will include testing processes over a period of time such as days (e.g., 5 days, etc.). Finally, the established delivery schedule will include a production phase which, again, will include an amount time (e.g., 1 day, etc.) during which a revised software system (if revised in accordance with results obtained during the acceptance and testing phase) is placed into operation in a general use community within a data processing environment.

Next, after an acceptable delivery schedule is established, a software system will be developed at step S1-4 based upon the requirements specified during step S1-2. Such development may include software development techniques which will be immediately understood by those skilled in the art.

Once a software system has been developed according to the established schedule as discussed above, an install package will be developed and tested at step S1-5. The Install package will be used by individual users and subsystems within a data processing environment and, in particular, in a test environment thereof to install the developed software system. The install package will include the developed software system and routines which are configured to automatically instantiate the software system in the test environment. Accordingly, the install package may be implemented as an install wizard within a MICROSOFT-based operating system environment such as within MICROSOFT WINDOWS 95™, 98™, and NT™.

Next, at step S1-6, the install package will be distributed to end-users or subsystems within the dynamic use environment for appropriate testing. Next, at step S1-7, a determination will be made as to whether revisions to the developed software system are necessary. If such revisions are necessary then they will be made and the established schedule will be adjusted (e.g., time will be added) at step S1-8, and further process operations will continue back to step S1-5 as discussed above.

If, at step S1-7, the determination was negative, process flow commences at step S1-9. At step S1-9, the revised software system will be placed into general use within a data processing environment. Next, at step S1-10 a determination will be made as to whether the project or need originally calling for the developed software system, has been terminated. If such a project or need has been terminated, the process flow ends at step S1-11.

If, at step S1-10, the need for the project still exists, process flow continues to step S1-12 where the software system will be monitored for effectiveness within the dynamic use environment. Such effectiveness may also be measured based upon the generation of statistics regarding the software system (for example, statistics based upon support inquiries, problem reports, resource use etc.). Thereafter, processing will proceed back to step S1-2 as discussed above thereby creating a software development process and software lifecycle which is reliable and repeatable.

Figure 2:
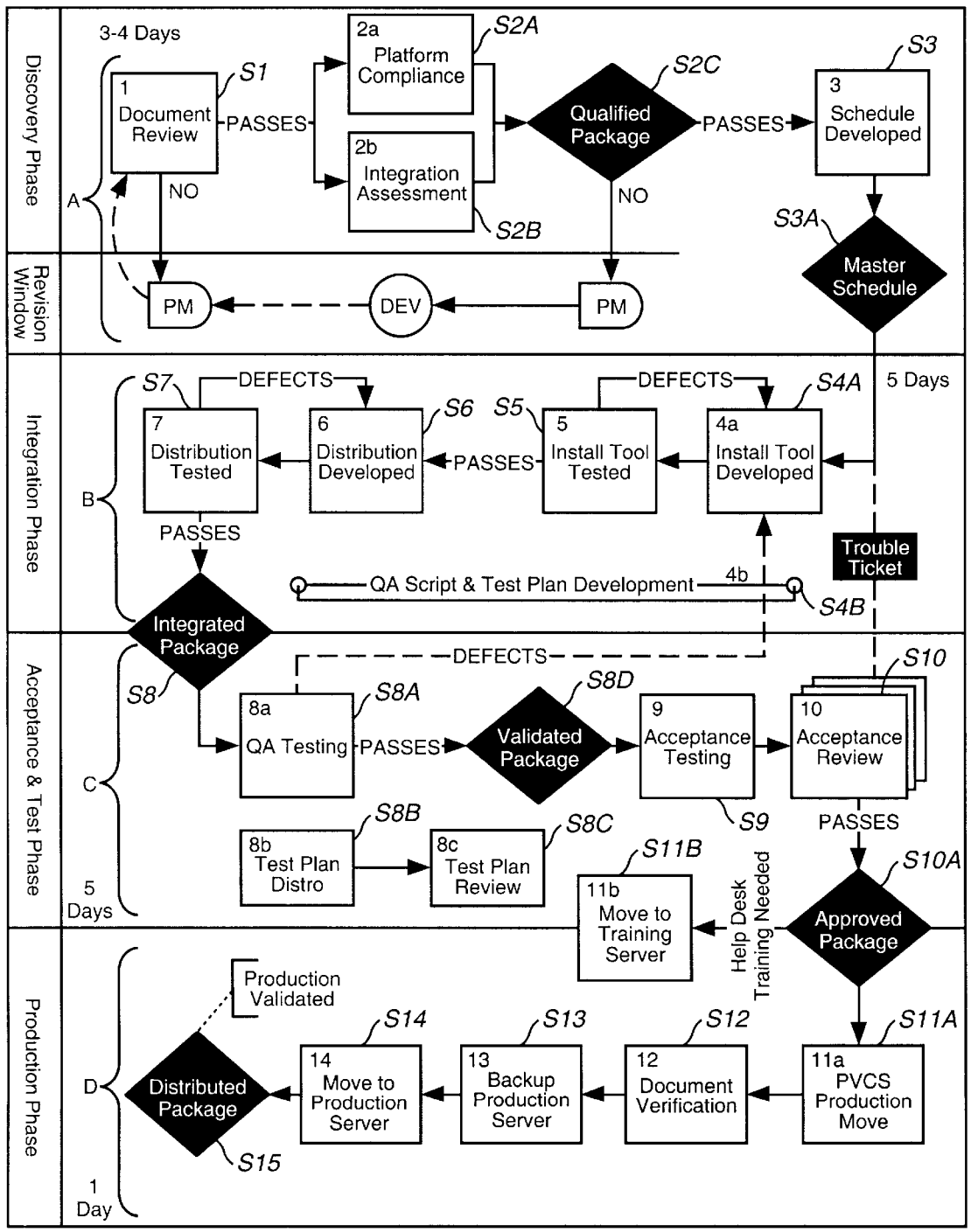
FIG. 2 is a flowchart that illustrates, in detail, a reliable and repeatable process for specifying, developing, distributing, and monitoring a software system within a dynamic environment according to a preferred embodiment of the present invention.

Referring now to FIG. 2, depicted therein is a flow chart that illustrates, in detail, a reliable and repeatable process for specifying, developing, distributing, and monitoring a software system within a dynamic use environment according to a preferred embodiment of the present invention. In particular, during a discovery and revision phase, lasting say 3–4 days, documents related to requirements for a particular software system are developed and/or reviewed at step S1. At the same time, a promotional message may be issued if the appropriate documents containing system requirements are not reviewed and/or created. Once documents containing such system requirements have been reviewed, process flow continues to steps 2A and 2B for a determination as to platform compliance and the assessment of an integration plan. At step S2C, a determination will be made as to whether a qualified package has been generated. Such a qualified package will contain specifications for a software system, development dependencies, time frames, etc. If such a qualified package has been created, process flow continues to step S3 where a delivery schedule will be developed based upon a master schedule as identified at process step S3A.

Once a delivery schedule is created, a development cycle will be initiated within a revision window during the discovery phase to develop a software system consistent and compliant with software system requirements specified during step S1.

If, at step S2C a qualified package was not generated containing a developed software package in compliance with system requirements as specified at step S1, a promotional message or other notice may be published regarding development of the software package prior to such development. Such a promotional message may be distributed via a web enabled interface on an intranet or other network facility.

Once a master schedule has been developed, process flow continues to step S4A and S5. At such steps, an install tool will be developed and tested. The install tool is intended to enable a user or subsystem within a dynamic use environment to install the developed software package in an automatic fashion.

Once the install tool has been developed and tested, process flow continues to steps S6 and S7. At such steps a distribution process will be established for distributing the install tool which contains the developed software system and any scripts necessary to automatically install the same within a computing platform.

After step S7, if an install tool was appropriately developed, tested, and distributed, an integrated package will be said to have been created at step S8 and process flow will continue through steps S8A, S9, and S10. During such steps, a test user population will evaluate the software system based upon documented requirements and will determine an acceptance level based upon a validated software system. It should also be noted that at steps S8B and S8C, a subordinate process is created to evaluate a test plan distribution process (based on all or many software system operation sequences) and a test plan review process. Such subordinate processes will be immediately understood by those skilled in the art.

If, at step S8A, quality assurance testing results in the determination of defects relative to the test version of the software system which was developed and/or the install tool, appropriate defect reports can be provided to an appropriate resource group for revision of the software system. Accordingly, a revised install tool including, possibly, a revised software system may be redistributed for testing purposes. Accordingly, a revision cycle may be created between an integration phase and an acceptance and testing phase. It should be noted, that the cycling between an acceptance and testing phase and integration phase may affect the schedule established for distribution of a software system to a general user population based upon system requirements as determined at step S1 as discussed above.

If, at step S10, trouble reports (e.g., trouble tickets processed by help-desk personnel) are generated relative to the installation of a test software system, appropriate call center trouble tickets, for example, may be generated and passed back to an appropriate resource group for revising the software system and regenerating an appropriate install tool and software system which may be redistributed.

At step S11B the software system or a revised derivative thereof will be moved to a training server for training help desk personnel and other resources in the proper use of the software system. At step S11A, a software tool known as PVCS which is manufactured and marketed by INTERSOLVE CORPORATION (version 5.3) may be used to coordinate and manage the various objects and data necessary for the software system to be placed within a production and/or general use environment.

Next, at step S12, document verification will be carried out to insure that all documents and associated objects are maintained within a production environment.

Next, at step S13 a backup production server will be outfitted with a copy of the software system in the event that a primary system fails for any reason.

Next, at S14, the software system or a revised derivative thereof will be placed into actual use within a user community thereby resulting in a distributed package for general use as indicated at step S15.

Figure 3:
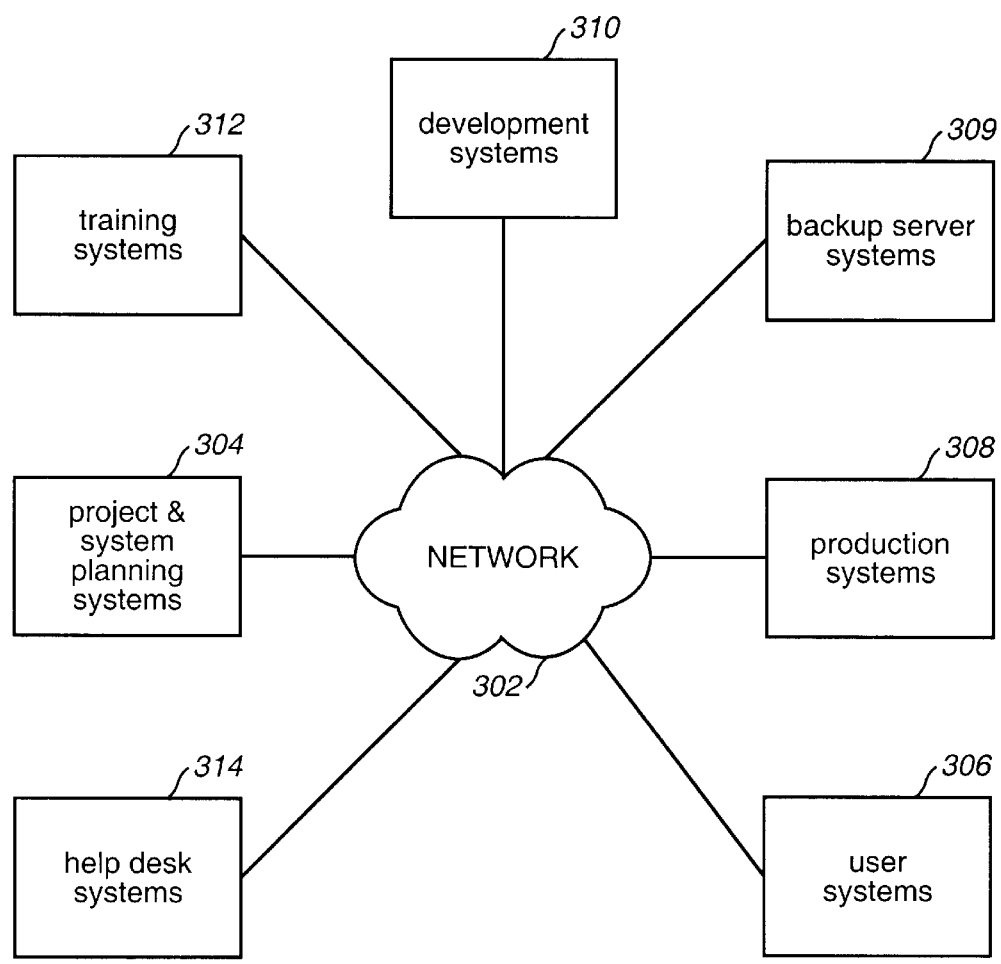
FIG. 3 is a diagram of a system in which a reliable and repeatable process for specifying, developing, distributing, and monitoring a software system within a dynamic environment may be deployed.

Referring now to FIG. 3, depicted therein is a diagram of system (a dynamic use environment) in which the reliable and repeatable processes for specifying, developing, distributing, and monitoring a software system discussed above may be deployed. In particular, system 300 includes a network 302, one or more project/system planning systems such as those equipped with project management facilities, a set of user systems 306 such as those within a particular user population, production server systems 308 which may be used to serve software components and objects including software systems developed in accordance with the present invention, backup systems 309 which may be used to provide backup functionality to production servers and other systems within system 300, development systems 310 which may be used by developers in developing software systems in accordance with or based upon specified requirements in accordance with the present invention, training servers and systems 312 which may be used by training personnel, help desk personnel etc. which may be used to train users within a particular user population in the use of a software system developed and distributed in accordance with the present invention, and help desk systems 314 which may be used to provide help desk services in relation to software systems that are operated within system 300.

Figure 4:
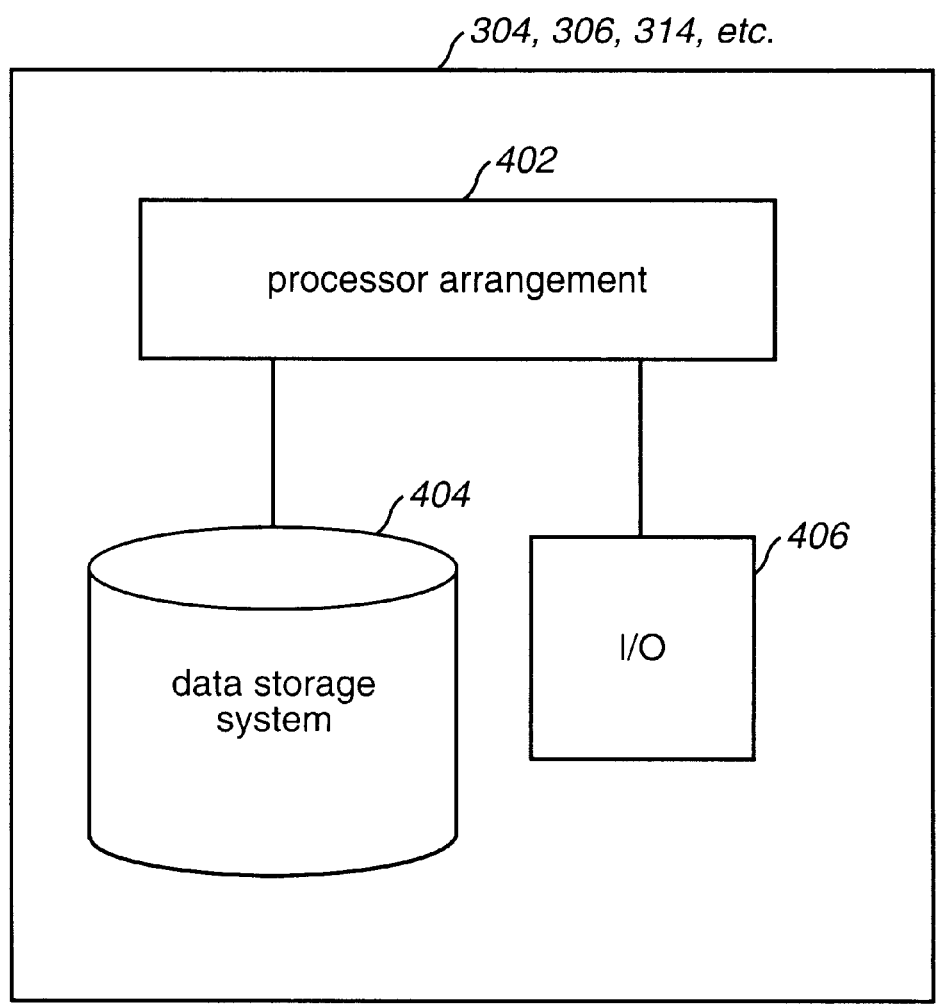
FIG. 4 is a block diagram of an automatic data processing system and one that may be used to facilitate a reliable and repeatable process for specifying, developing, distributing, and monitoring a software system within a dynamic environment.

Referring now to FIG. 4, depicted therein is an exemplary automatic data processing system such as a system that may be implemented as a project/system planning system 304, a user system 306, or a help desk system 314, etc. In particular, the automatic data processing system depicted in FIG. 4 includes a processor arrangement having one or more processing elements, a data storage system 404 having, among other things, disk arrays for storing data and programs utilized within system 300 (FIG. 3), and an I/O subsystem 406 that may be used to couple the automatic data processing system depicted in FIG. 4 with other computing and automatic data processing systems illustrated in system 300 in FIG. 3. The automatic data processing system depicted in FIG. 4 may be outfitted with project management facilities and software to allow implementation of the reliable and repeatable processes illustrated in FIGS. 1 and 2 which were discussed above.

Thus, having fully described the present invention by way of example with reference to the attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. A reliable and repeatable process for specifying, developing, distributing, and monitoring a software system within a data processing environment, comprising the steps of:

specifying a set of software system requirements during a discovery process within a data processing environment;

establishing a development and delivery schedule for distribution of said software system within said data processing environment, said delivery schedule being set in accordance with a prearranged master schedule;

developing a software system corresponding to said software system requirements during a development process within said data processing environment;

developing and testing an install package to be used to install said software system in a test environment within said data processing environment during an integration process, said install package including said software system and routines configured to automatically instantiate said software system in said test environment, said developing and testing step taking a first amount of time;

distributing said install package to a test user community for testing of said software system during a testing process, said distributing step taking a second amount of time;

revising said software system to comply with said software system requirements when a defect is discovered during said testing process and then repeating said developing and testing and said distributing steps with a revised software system, said revising step affecting said delivery schedule by adding a predetermined amount of time thereto; and placing said software system or said revised software system into general use relative to a particular user community within said data processing environment after successful completion of said testing process, said placing step taking a third amount of time, said first, second, and third amounts of time being predetermined based on said development and delivery schedule prior to development of said software system during said developing step.

2. The process according to claim 1, wherein said first, second, and third amounts of time are measured in days.

3. The process according to claim 1, wherein said developing step includes the production of an executable software system operable within at least one automatic data processing system within said data processing environment.

4. The process according to claim 1, further comprising the step of distributing a message related to the development of said software system, said message being distributed via said data processing environment.

5. The process according to claim 4, wherein said message is a message distributed via a network connection within said data processing environment.

6. The process according to claim 1, wherein said test environment includes at least one automatic data processing system configured to operate in accordance with said install package and said software system.

7. The process according to claim 1, wherein said placing step includes placing said software system on a network server system within said data processing environment to be accessed and copied to user systems within said data processing environment and executed thereby.

8. The process according to claim 1, wherein said developing step is performed by at least one development system within said data processing environment.

9. The process according to claim 1, wherein said set of software system requirements includes data flow requirements.

10. The process according to claim 1, wherein said testing process includes a Q&A evaluation relative to said software system.

11. The process according to claim 1, wherein said predetermined amount of time added to said delivery schedule is measured in days.

* * * * *